United States Patent [19]
Chen et al.

[11] Patent Number: 5,637,976
[45] Date of Patent: Jun. 10, 1997

[54] METHOD AND APPARATUS FOR RMS CURRENT MEASUREMENT IN INDUCTION MOTORS WITHOUT A CURRENT TRANSFORMER

[75] Inventors: Li Chen, Milwaukee, Wis.; Peter Unsworth, Lewes, England

[73] Assignee: Allen-Bradley Company, Inc., Milwaukee, Wis.

[21] Appl. No.: 536,723

[22] Filed: Sep. 29, 1995

[51] Int. Cl.⁶ .................................................. H02P 7/36
[52] U.S. Cl. ..................... 318/809; 318/805; 318/806; 318/807
[58] Field of Search ............................... 318/138, 245, 318/254, 260–289, 699–832

[56] References Cited

U.S. PATENT DOCUMENTS

| | | | |
|---|---|---|---|
| 4,710,692 | 12/1987 | Libert et al. | 318/729 |
| 4,757,241 | 7/1988 | Young | 318/254 |
| 4,833,628 | 5/1989 | Curran, Jr. | 318/800 |
| 4,912,390 | 3/1990 | Curran, Jr. et al. | 318/812 |
| 5,144,564 | 9/1992 | Naidu et al. | 318/721 |
| 5,153,489 | 10/1992 | Unsworth et al. | 318/490 |
| 5,325,026 | 6/1994 | Lyons et al. | 318/254 |
| 5,334,917 | 8/1994 | Lind | 318/254 |
| 5,473,241 | 12/1995 | Chen et al. | 318/807 |
| 5,488,281 | 1/1996 | Unsworth et al. | 318/806 |

*Primary Examiner*—Paul Ip
*Attorney, Agent, or Firm*—Michael A. Jaskolski; John M. Miller; John J. Horn

[57] ABSTRACT

A method and apparatus to be used with a motor controller for determining RMS line current during a start-up period or a stalled period using electrical values known to the controller. Various equations relate RMS line current to monitored thyristor and source voltages as well as the duration of non-conducting periods in line voltages to determine the RMS line current.

24 Claims, 5 Drawing Sheets

5,637,976

1

METHOD AND APPARATUS FOR RMS CURRENT MEASUREMENT IN INDUCTION MOTORS WITHOUT A CURRENT TRANSFORMER

FIELD OF THE INVENTION

The present invention relates to a system for determining RMS current in a three-phase AC induction motor. More particularly, the present invention relates to a method and/or apparatus used with a motor controller which determines RMS current through a motor terminal during a motor starting operation using electrical parameters already known to the controller and without sampling discrete currents.

DESCRIPTION OF THE ART

One type of commonly designed induction motor is a three phase motor having three Y-connected stator windings. In this type of motor, each stator winding is connected to an AC voltage source by a separate supply line, the source generating currents therein.

A conventional controller for this type of motor has separate solid state switches connecting each stator winding to one of the supply lines. Each solid state switch is formed by either a triac or a pair of back-to-back connected silicon controlled rectifiers (SCR's), commonly referred to as a thyristor. The thyristor based control systems operate by introducing a non-conducting period, or notch, into every half cycle of supply line voltage. By altering the duration of the notch, the motor terminal voltages can be limited and hence the current through the stator windings can be controlled.

In most motor control schemes, RMS voltage and current values are required in order to provide corrective feedback loops to ensure precise motor operation during steady state driving periods. In addition, it is particularly important for protective purposes to monitor RMS current values during start-up and stalled operating conditions.

During steady state operation, as a motor rotor spins, magnetic interaction between rotor and stator windings provides increased resistance to stator winding current. Thus, at a rated voltage with minimal rotor slip during steady state operation, the stator current will be relatively stable. However, upon starting a motor, when rotor slip is substantial and resistance to stator current is minimal, normal stator winding voltage can result in excessive stator current levels as high as ten times the full load current. Current of this magnitude increases motor component temperature and can either damage or destroy motor components. Hence, it is extremely important that RMS current be monitored during start-up and stalled conditions so that, if the RMS current is outside a safe range, the current may be altered or the motor may be turned off until it can be properly serviced.

While thyristor based control systems have enabled precise control of stator currents and voltages, because they operate by introducing a non-conducting period into the purely sinusoidal supply voltage and current waveforms, they make it extremely difficult to ascertain an accurate RMS current value.

Referring to FIGS. 2(a) and 2(b), typical stator current $I_T$ and terminal voltage $V_T$ waveforms can be observed. As the stator current $I_T$ waveform is not sinusoidal, RMS current determination is computationally complex.

U.S. Pat. No. 5,153,489 entitled "ELECTRIC CURRENT MEASUREMENT APPARATUS FOR A SOLID STATE

2

MOTOR CONTROLLER" which issued on Oct. 6, 1992, describes one method of determining RMS current without the need for additional hardware such as a current transformer. Therein, a fundamental RMS current value is related to line RMS current by a function of the duration of the non-conducting period in each half cycle of phase voltage (See FIG. 2(b)). While this method provides an accurate RMS current value during steady-state motor operation, it has proven ineffective during start-up and stalled motor conditions. During start up time or stalled periods, the relationships identified in the above referenced application are inaccurate and cannot be relied upon.

Another more typical way to measure RMS current is to place transformers on each voltage supply line. Each transformer isolates a current signal from the supply voltage and steps the current down from the high value found in motors (e.g. 10–1,000A) to a value convenient to handle for signal processing (e.g. 100 mA). Deriving true RMS current values has typically required sampling the current in each line (at least 12 samples per cycle are needed, and usually 50 or more for RMS accuracy of a few percent). Next, each sampled current value has typically been squared, the squares averaged to get a mean square value, and then the square root of the mean square calculated.

This solution to the RMS current measurement problem requires a large amount of computational time which limits the ability of the motor controller to monitor and control other motor parameters. To limit computational time, a faster controller could be employed which could accommodate many more calculations in a short period. A faster controller could do the RMS calculations and, at the same time,. monitor and control other motor operations. However, a faster controller would still need to sample discrete current values which would require current transforming hardware in addition to the controller and the usual controller sensors. Thus, this solution cannot be implemented using a typical motor controller without providing additional hardware.

Therefore, it would be valuable to have a method and/or apparatus by which RMS current could be derived during motor starting conditions using information already monitored by existing controllers without costly and time consuming discrete sampling and with only a minimum numbers of calculations.

SUMMARY OF THE INVENTION

The present invention includes both a method and an apparatus to be used with the motor controller for determining RMS line current in each phase of a three-phase AC induction motor during a start-up period using motor parameters which are already monitored by the motor controller. In one embodiment, where a locked rotor current code is provided by a motor manufacturer, the controller detects both thyristor voltage and source voltage as well as the duration of the non-conducting period and determines RMS line current therefrom. In another embodiment, where the locked rotor current code is not available, a two-phase excitation calibration is conducted prior to three-phase motor operation wherein motor reactance is calculated from source voltage and a monitored RMS line current. The controller then uses the motor reactance during three-phase motor operation to determine the RMS line current during the start-up period.

Therefore, it is one object of the invention to provide a method and apparatus by which a conventional motor controller can determine RMS line currents in stator windings during a start-up period without a current transformer. By using the thyristor voltage, source voltage, and duration of the non-conducting period, RMS current can be determined in a short number of calculations rather than several hundred. In this manner, RMS current values during start-up can be determined without monopolizing the computing power of the motor controller and the controller can be used to monitor and regulate other motor parameters.

Another object is to take advantage of any locked rotor current information provided by a motor manufacturer to determine RMS line current during a starting period. It has been observed that the ratio of locked rotor current to rated voltage reflects the ratio of RMS fundamental current through a winding to RMS fundamental voltage across that same winding. Thus, by using manufacturer provided locked rotor and rated voltage information, where RMS fundamental voltage can be determined, RMS fundamental current can easily be calculated. RMS fundamental current can then be used to find RMS line current.

Yet another object is to determine motor reactance prior to three phase motor excitation, which can be used to calibrate the motor controller hence equipping the controller to accurately assess RMS line current. Prior to three phase excitation, the motor can be excited in two phase and its reactance determined. Then, during three phase excitation, thyristor reactance can be calculated from the motor reactance and the duration of the non-conducting period. Measuring thyristor voltage and dividing thyristor voltage by thyristor reactance gives the RMS line current.

A further object is to provide RMS line current during start-up periods using hardware already existing in most motor controllers. Controllers are typically equipped to measure or determine thyristor voltage, source voltage and the duration of non-conducting periods. The present invention facilitates determination of RMS line current during start-up periods using only source and thyristor voltage and non-conducting period duration.

Other and further aspects of the present invention will become apparent during the course of the following description and by reference to the accompanying drawings.

DETAILED DESCRIPTION OF THE PREFERRED EMBODIMENT

Figure 1:
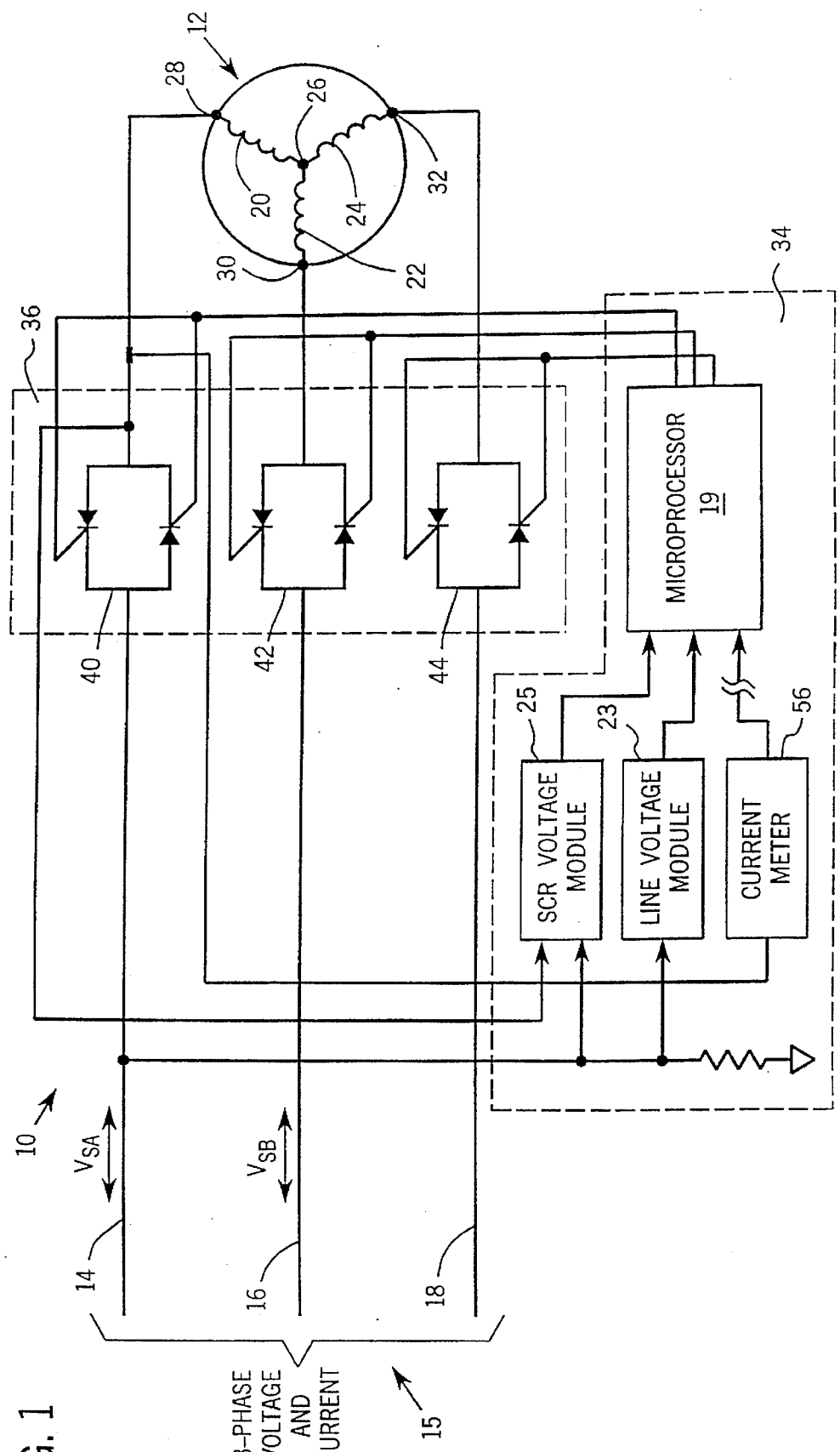
FIG. 1 is a schematic diagram of a motor and a controller which incorporates the present invention.

In the description that follows, the subscript f will be used to denote fundamental values, the subscript S will be used to denote source values, the subscript Thy will be used to denote thyristor values, the subscript T will be used to denote terminal values, the subscript l will be used to denote line values, the subscript p will denote peak values, and the subscripts A and B will be used to denote different motor phases and associated supply lines. The present invention could be used to calculate RMS line currents through each of three motor stator windings. The method and apparatus of the present invention required to monitor three windings would simply be duplicative of the system required to determine the current through a single winding. Therefore, in order to simplify this explanation, a system for determining RMS line current through a single stator winding will be described in detail.

The present invention will be described in the context of the exemplary motor control system 10 shown in FIG. 1. The system 10 monitors alternating supply line voltage and thyristor voltage on a single motor phase and uses these parameters to determine fundamental RMS terminal voltage $V_{frms}$ and fundamental RMS current $I_{frms}$, which are in turn used to calculate RMS line current $I_{lrms}$. The RMS line current $I_{lrms}$ can then be used by the control system 10 to perform a controlled motor start and eliminate excessive stator winding currents.

The induction motor 12 has three stator windings 20, 22, 24 which are coupled in a Y-configuration at neutral node 26. The distal end of each stator winding 20, 22, 24 is connected to the supply line 14, 16, 18 at a motor terminal 28, 30, 32 respectively. The phase of the voltage on supply line 14 leads the phase of the voltage on supply line 16 which in turn leads the phase voltage on supply line 18.

The motor control system 10 consists of a control module 34, a thyristor switch module 36, and a plurality of other components which will be described in more detail below. Within the control module 34, there are a plurality of sub-modules, namely a line voltage module 23 and an SCR voltage module 25 both of which feed information to a microprocessor 19.

The thyristor switch module 36 has three separate thyristor switches 40, 42, 44. Each thyristor switch 40, 42, 44 consists of a pair of inversely connected silicon controlled rectifiers (SCR's). Each thyristor switch 40, 42, 44 is used to control the voltage on, and current through, an associated supply line 14, 16 or 18 for altering current supplied to, and voltage across the terminals of the motor 12. For explanation purposes, the motor phase associated with winding 20 will be examined.

Figure 2A:
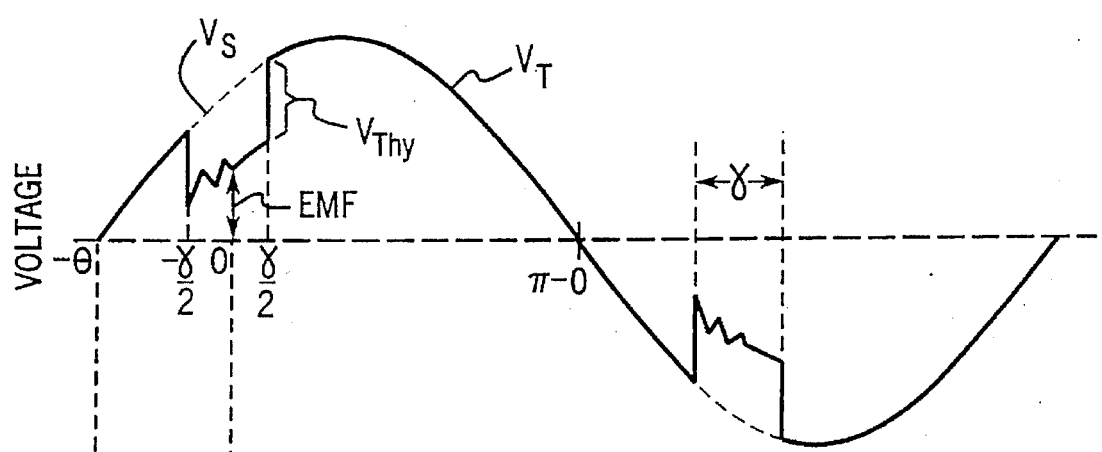
FIGS. 2(a) and 2(b) are graphs illustrating the voltage across and current through a pair of SCRs in FIG. 1 as a function of time.
Figure 2B:
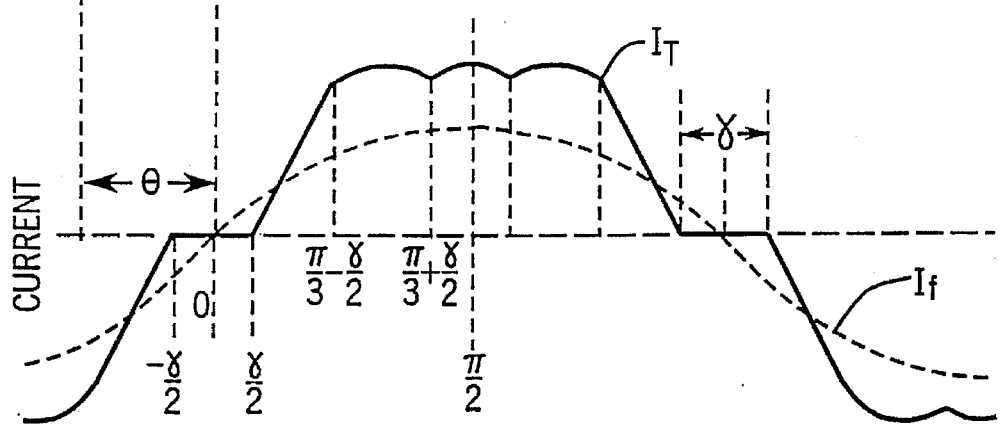

Referring also to FIGS. 2(a) and 2(b), the current and voltage on supply line 14 may be compared to the current and voltage of the AC source 15. In FIG. 2(a), the supply voltage $V_s$ is sinusoidal. The terminal voltage $V_T$ is generally identical to the supply voltage $V_s$, except for during a small non-conducting time, or notch having a duration of $\gamma$, which is introduced into each half cycle of supply voltage $V_s$. The notch $\gamma$ is introduced into the supply voltage $V_S$ each time an associated line current $I_l$ falls to zero. The line current $I_l$ remains zero until the end of the notch $\gamma$, at which time the current $I_l$ continues a pulsating waveform having a fundamental sinusoidal component $I_f$ which generally lags the terminal voltage $V_T$ by the angle $\theta$ of the power factor of the motor.

The control system 10 used with the present invention alters supply line current $I_l$ by controlling the period of notch $\gamma$. During the duration $\gamma$, the thyristor pair 40 connecting stator winding 20 to the voltage source operates as an open circuit, so that, instead of observing the sinusoidal supply voltage at the terminal 28, an internally generated motor back EMF voltage may be seen. This gives the notch γ in the observed waveform at the terminal 28. Although introducing the notch γ into the waveforms of FIGS. 2(a) and 2(b) allows a user to control line current and terminal voltage, it makes it extremely difficult to derive an RMS value for line current $I_l$ through the stator winding 20 as the current is clearly not sinusoidal.

A. RMS Line Current Without A Current Transformer With LRC Code

To help motor operators operate motors within a proscribed safe current range, industry associations generally require that manufacturers supply operators with various motor parameter values prior to receiving association endorsement. For example, manufacturers are typically required to provide horsepower (HP) and rated voltage ($V_{RATE}$) values. In addition, manufacturers may also be required to provide a locked rotor current code (CODE) which can be used to determine a locked rotor current (LRC) according to the following equation:

$$LRC = \frac{1000 * HP * CODE}{1.732 * V_{RATE}} \quad (1)$$

The LRC reflects the stator winding current produced when the motor is driven at its rated voltage $V_{RATE}$ and rated frequency while the rotor is prohibited from rotating. When in the locked state, motor parameter values reflect motor conditions during start-up or stalled periods when the rotor is temporarily stationary. Thus, upon start-up, if the rated voltage $V_{RATE}$ was applied to the stator windings, the stator current would be equal to LRC. However, typical motor controllers are capable of supplying less than the rated voltage $V_{RATE}$ during start-up to limit stator currents.

Referring again to FIG. 1, to start the motor 12, the control module 34 varies thyristor switch trigger times to provide a gradual increase in terminal voltage. Referring also to FIG. 2(a), in doing so, the switches 40, 42, 44 are initially triggered relatively late in the voltage half-cycles and are conductive for only a short period. The trigger times then become progressively earlier in each half-cycle to render the switches 40, 42, 44 conductive for longer intervals and apply greater amounts of voltage to the motor until it reaches full speed and the rated voltage $V_{RATE}$.

Thus, the control module 34 and switch module 36 can be used to provide voltage values other than the rated voltage $V_{RATE}$ by altering the width of the notch γ. In this manner, the line current $I_l$ during start-up or stalled operation can be varied. The ability to vary terminal voltage $V_r$ during start-up periods means that, despite the effectively locked (i.e., stationary) state of a rotor during initial excitation, the current therethrough will be different when the terminal voltage $V_T$ is less than the rated voltage $V_{RATE}$.

It has been observed that the ratio of LRC to rated voltage $V_{RATE}$ is proportional to the ratio of the fundamental RMS current $I_{frms}$ to the fundamental RMS voltage $V_{frms}$ such that:

$$I_{frms} = \frac{LRC * V_{frms}}{V_{RATE}} \quad (2)$$

As the LRC and the rated voltage $V_{RATE}$ are known, once the fundamental RMS terminal voltage $V_{frms}$ is calculated, the fundamental RMS line current $I_{frms}$ can be determined. In addition, it has been determined that the RMS line current $I_{lrms}$ the parameter of interest, is related to the fundamental RMS line current $I_{frms}$ by a function F of the notch width γ such that:

$$I_{lrms} = \frac{I_{frms}}{F(\gamma)} \quad (3)$$

Hence, where a manufacturer provides the LRC code, the RMS line current $I_{lrms}$ can be derived and monitored despite a lack of direct current sensing capability.

Referring again to FIGS. 2(a) and 2(b), the terminal voltage $V_T$ can be expressed in segmented form as:

$$V_T(t) = \begin{cases} V_S(+) & 0 < \omega t < \theta - \frac{\gamma}{2} \\ V_S(+) - V_{Thy} & \theta - \frac{\gamma}{2} < \omega t < \theta + \frac{\gamma}{2} \\ V_S(+) & \theta + \frac{\gamma}{2} < \omega t < \pi \end{cases} \quad (4a)$$

where the thyristor voltage $V_{Thy}(t)$ is $-V_{Thy}$ where $\theta - \gamma/2 < \omega t < \theta + \gamma/2$ and is zero everywhere else and the source voltage $V_s$ is:

$$V_s(\omega t) = V_s \sin(\omega t) \quad 0 < \omega t < \pi \quad (4b)$$

Therefore, the peak value of the fundamental component of thyristor voltage can be calculated as:

$$V_{Thyf}(t) = \frac{2}{\pi} \int_{-\frac{\gamma}{2}}^{\frac{\gamma}{2}} V_{Thy} \cos(\omega t) dt \quad (5)$$

where ωt=0 is chosen in the middle of notch γ. Equation 5 can be integrated and simplified so that:

$$V_{Thyfp} = \frac{4}{\pi} V_{Thy} \sin\frac{\gamma}{2} \cos(\omega t - \theta) \quad (6)$$

where the θ accounts for the phase shift in FIG. 2(a). From Equation 4(a) and FIG. 2(a) it can be seen that the fundamental component of the terminal voltage $V_{Tf}$ is:

$$V_{Tf}(t) = V_s(t) + V_{Thyf}(t) \quad (7)$$

Combining Equations 4(a), 4(b), 6 and 7 and simplifying:

$$V_{Tf}(t) = \left( V_S - \frac{4}{\pi} V_{Thy} \sin\frac{\gamma}{2} \sin\theta \right) \sin(\omega t) - \left( \frac{4}{\pi} V_{Thy} \sin\frac{\gamma}{2} \cos\theta \right) \cos(\omega t) \quad (8)$$

As the sin(ωt) and cos(ωt) portions of Equation 8 are perpendicular, by squaring the sin(ωt) and cos(ωt) portions of Equation 8, adding the squares, and taking the square root of the sum, the peak value of fundamental terminal voltage can be found:

$$V_{Tfp} = \sqrt{\left( V_S - \frac{4}{\pi} V_{Thy} \sin\frac{\gamma}{2} \sin\theta \right)^2 + \left( \frac{4}{\pi} V_{Thy} \sin\frac{\gamma}{2} \cos\theta \right)^2} \quad (9)$$

Assuming pure inductance in the stator winding the phase angle θ can be assumed to be 90° so that cosθ=0 and sinθ=1 and Equation 9 simplifies to:

$$V_{Tfp} = V_S - \frac{4}{\pi} V_{Thy} \sin\frac{\gamma}{2} \quad (10)$$

Equation 10 represents the phase voltage peak value of the fundamental voltage. Converting to the RMS fundamental voltage between lines:

$$V_{frms} = \frac{\sqrt{3}}{\sqrt{2}}(V_{Tfp}) = \frac{\sqrt{3}}{\sqrt{2}}\left(V_S - \frac{4}{\pi}V_{Thy}\sin\frac{\gamma}{2}\right) \quad (11)$$

Using Equation 11, an accurate RMS fundamental voltage value can be obtained by simply monitoring the supply voltage $V_s$, the thyristor voltage $V_{Thy}$, and the notch width $\gamma$.

Once the RMS fundamental voltage $V_{frms}$ is determined, that value can be plugged into Equation 2 to provide the RMS fundamental current value $I_{frms}$.

Referring again to Equation 3, the RMS line current $I_{lrms}$ can now be determined without a current transformer if $F(\gamma)$ can be derived. Equation 3 can be rearranged so that:

$$F(\gamma) = I_{frms}/I_{lrms} \quad (12)$$

Thus, by finding a $\gamma$ dependent expression for $I_{lrms}$ and $I_{frms}$, an expression for $F(\gamma)$ can be obtained.

Referring again to FIG. 2(b), the period for the current waveform $I_T$ is $2\pi$. Thus, the RMS line current $I_{lrms}$ for one period can be expressed as:

$$I_{lrms} = \sqrt{\frac{1}{2\pi}\int_0^{2\pi} i^2(\omega t)d(\omega t)} \quad (13)$$

where I is the line current. Since the waveform of the current in FIG. 2(b) is symmetrical with respect to the vertical axis, Equation 13 can be simplified so that:

$$I_{lrms} = \sqrt{\frac{2}{\pi}\int_0^{\frac{\pi}{2}} i^2(\omega t)d(\omega t)} \quad (14)$$

Referring still to FIG. 2(b), the mathematical representation of the line current has been derived and can be expressed as four segment equations as follows:

$$i(\omega t) = \sqrt{3}\left(\cos(\omega t) - 2\cos\left(\frac{\pi}{2} - \frac{\gamma}{2}\right)\right) \quad (15)$$

for $0 < \omega t < \pi/6 - \frac{\gamma}{2}$ $$i(\omega t) = \frac{3}{2}\left(\cos\left(\omega t - \frac{\pi}{6}\right) - \sqrt{3}\cos\left(\frac{\pi}{2} - \frac{\gamma}{2}\right)\right) \quad (16)$$

for $\frac{\pi}{6} - \frac{\gamma}{2} < \omega t < \frac{\pi}{6} + \frac{\gamma}{2}$ $$i(\omega t) = \sqrt{3}\left(\cos(\omega t) - \cos\left(\frac{\pi}{2} - \frac{\gamma}{2}\right)\right) \quad (17)$$

for $\frac{\pi}{6} + \frac{\gamma}{2} < \omega t < \frac{\pi}{2} - \frac{\gamma}{2}$ $$i(\omega t) = 0 \quad (18)$$

for $\frac{\pi}{2} - \frac{\gamma}{2} < \omega t < \frac{\pi}{2}$

Combining Equations 14–18, integrating and simplifying can be expressed as:

$$I_{lrms} = \frac{\sqrt{3}}{2\sqrt{\pi}}\sqrt{6(\pi - \gamma) + (3\gamma - 4\pi)\cos(\gamma) - 9\sin(\gamma)} \quad (19)$$

Referring again to FIG. 2(b), because the expression for line current is an even function the fundamental component can be expressed as:

$$I_f = \frac{4}{\pi}\int_0^{\frac{\pi}{2}} i(\omega t)\cos(\omega t)d(\omega t) \quad (20)$$

Therefore, the RMS fundamental current is:

$$I_{frms} = \frac{4}{\sqrt{2}\,\pi}\int_0^{\frac{\pi}{2}} i(\omega t)\cos(\omega t)d(\omega t) \quad (21)$$

Combining Equations 15–18 and 21, integrating, and simplifying:

$$I_{frms} = \frac{\sqrt{6}}{4\pi}(2\pi - 3\sin\gamma - 3\gamma) \quad (22)$$

Combining Equations 12, 19, and 22, $F(\gamma)$ can be expressed as:

$$F(\gamma) = \frac{\sqrt{2}}{2\sqrt{\pi}} * \frac{2\pi - 3\gamma - 3\sin\gamma}{\sqrt{6(\pi - \gamma) + \cos\gamma(3\gamma - 4\pi) - 9\sin(\gamma)}} \quad (23)$$

Thus, Equation 3 can be used to determine RMS line current $I_{lrms}$ entirely as of a function of already measured voltages $V_s$ and $V_{Thy}$ and the notch width $\gamma$.

Referring again to FIG. 1, the SCR voltage module 25 determines the thyristor voltage $V_{Thy}$ across thyristor 40 and the line voltage module 23 determines the source voltage $V_s$ on line 14, both values being passed on to the microprocessor 19 for processing. As the microprocessor 19 selects the notch $\gamma$ duration during each cycle, the notch duration $\gamma$ is known and can be used to find RMS line current $I_{lrms}$ according to Equation 3. Once the RMS line current $I_{lrms}$ is found, it is used by the microprocessor 19 for other control purposes.

Commonly $I_{lrms}$ is compared to a threshold current value to assess the likelihood of motor damage due to the calculated current level. Where the RMS line current $I_{lrms}$ approaches the threshold level, the microprocessor will either reduce the $I_{lrms}$ current via increased notch width $\gamma$ or will turn off the motor entirely until it can be serviced.

B. RMS Line Current Without A Current Transformer And Without LRC Code

The above described embodiment of the present invention works well when the locked rotor current code (CODE) in Equation 1 is provided by a motor manufacturer. However, since the LRC CODE is not a worldwide standard, the CODE corresponding to a specific motor will often not be available to an operator. In these cases, the above described embodiment of the invention is unable to provide a useful RMS line current value.

Where the LRC CODE is not available, another method, including a calibration step, must be used to determine a motor reactance value prior to motor start-up. In this method, the microprocessor 19 is used to excite the motor in a manner which simulates a locked rotor condition. During the locked rotor simulation, the source voltage is monitored and used to determine the fundamental RMS voltage. In addition, a line current is monitored using additional current sensing hardware from which the fundamental RMS current is determined. The fundamental RMS voltage and current are then used to determine motor reactance $X_\sigma$. After this calibration step is performed, the motor reactance $X_\sigma$ is provided to the controller prior to three phase motor excitation.

During three phase start up excitation, the controller uses the motor reactance $X_\sigma$ determined during the calibration step to determine the line RMS current $I_{lrms}$ as a function of the duration of notch $\gamma$.

Figure 3A:
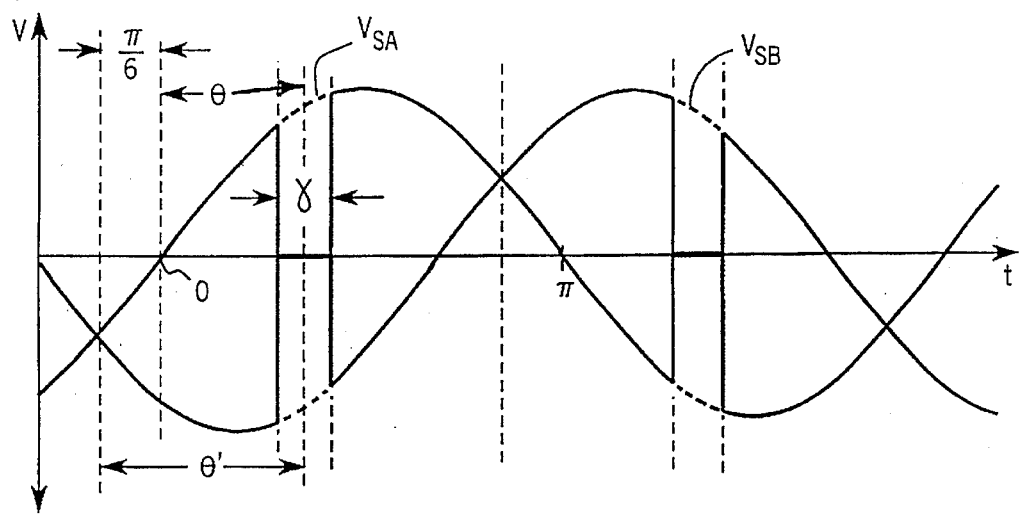
FIG. 3(a) is a graph illustrating the voltages across two separate thyristor switches in FIG. 1 as a function of time.

To simulate the locked rotor condition for calibration purposes, only two of the three motor phases are excited. Referring now to FIGS. 1 and 3(a), two curves representing source voltages $V_{SA}$ and $V_{SB}$ on lines 14, 16 for firing two of the three motor phases during motor calibration can be observed. Source voltage $V_{SA}$ leads source voltage $V_{SB}$ by 120 degrees. The origin for curves in FIGS. 3(a) and 3(c) will be the zero crossing point of the voltage $V_{SA}$ identified in FIG. 3(a). The phase voltages for $V_{SA}$ and $V_{SB}$ can be expressed as:

$$V_{SA} = V_S \sin(\omega t) \quad (24)$$

$$V_{SB} = V_S \sin\left(\omega t + \frac{2\pi}{3}\right)$$

Figure 3B:
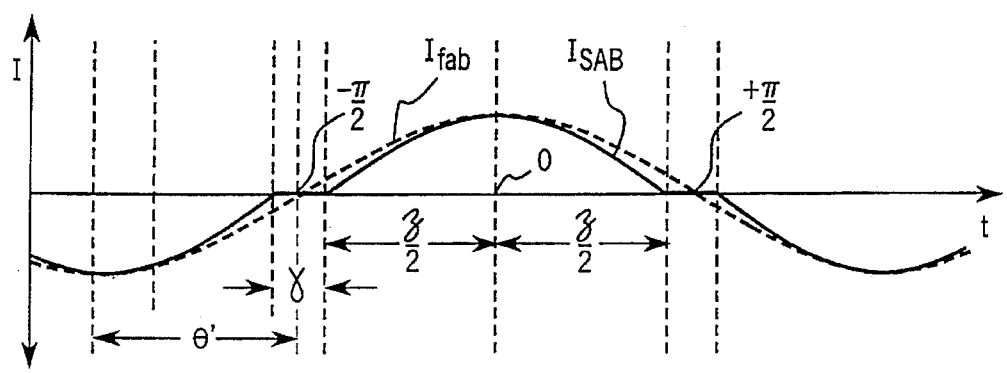
FIG. 3(b) is a graph illustrating two-phase current resulting from the voltages of FIG. 3(a)
Figure 3C:
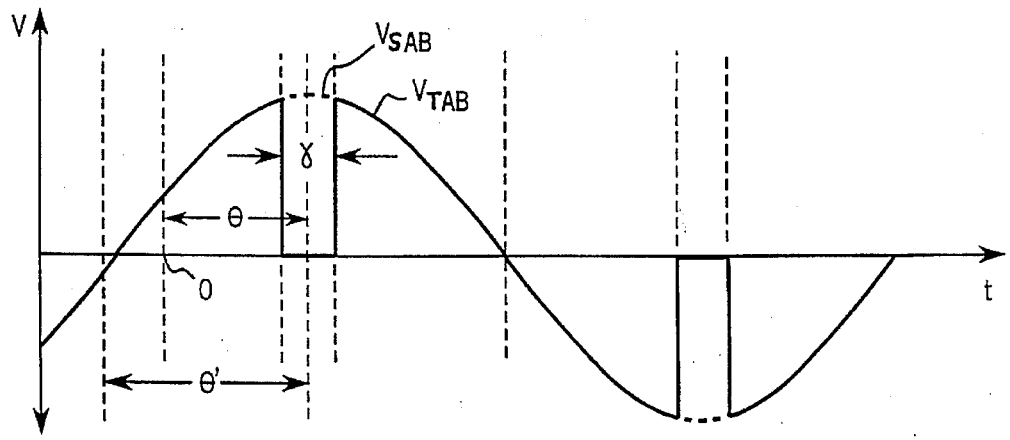
FIG. 3(c) is a graph illustrating the line-to-line voltage resulting from the two-phase voltages depicted in FIG. 3(a)

Referring also to FIG. 3(c), the line to line voltage across lines 14 and 16 leads line voltage $V_{SA}$ by $\pi/6$ but has the same period. Thus, line to line voltage $V_{SAB}$ can be expressed as:

$$V_{SAB} = \sqrt{3}\, V_S \sin\left(\omega t + \frac{\pi}{6}\right) \quad (25)$$

Referring still to FIGS. 1 and 3(c), the terminal voltage $V_{TAB}$ across lines 14 and 16 can be expressed in segmented form as:

$$V_{TAB} = \begin{cases} V_{SAB} & 0 < \omega t < \theta - \frac{\gamma}{2} \\ 0 & \theta - \frac{\gamma}{2} < \omega t < \theta + \frac{\gamma}{2} \\ V_{SAB} & \theta + \frac{\gamma}{2} < \omega t < \pi \end{cases} \quad (26)$$

and the thyristor voltage $V_{Thy}$ will be:

$$V_{Thy} = V_{SAB} \quad \theta - \gamma/2 < \omega t < \theta + \gamma/2 \quad (27)$$

and everywhere else $V_{Thy}$ is zero. Because the thyristor voltage $V_{Thy}$ is periodic, a fundamental component of thyristor voltage can be expressed as the Fourier series:

$$V_{Thyf} = a_1 \sin(\omega t + \pi/6) + b_1 \cos(\omega t + \pi/6) \quad (28)$$

where:

$$a_1 = \frac{2}{\pi} \int_{\theta - \frac{\gamma}{2}}^{\theta + \frac{\gamma}{2}} V_{Thy} \sin\left(\omega t + \frac{\pi}{6}\right) d\omega t \quad (29)$$

and:

$$b_1 = \frac{2}{\pi} \int_{\theta - \frac{\gamma}{2}}^{\theta - \frac{\gamma}{2}} V_{Thy} \cos\left(\omega t + \frac{\pi}{6}\right) d\omega t \quad (30)$$

Combining Equations 25, 27, and 29, as well as equations 25, 27, and 30, and solving for $a_1$ and $b_1$:

$$a_1 = \frac{\sqrt{3}\, V_S(\gamma - \cos 2\theta' \sin\gamma)}{\pi} \quad (31)$$

-continued $$b_1 = \frac{\sqrt{3}\, V_S(\sin 2\theta' \sin\gamma)}{\pi} \quad (32)$$

where $\theta' = \theta + \pi/6$.

Figure 4:
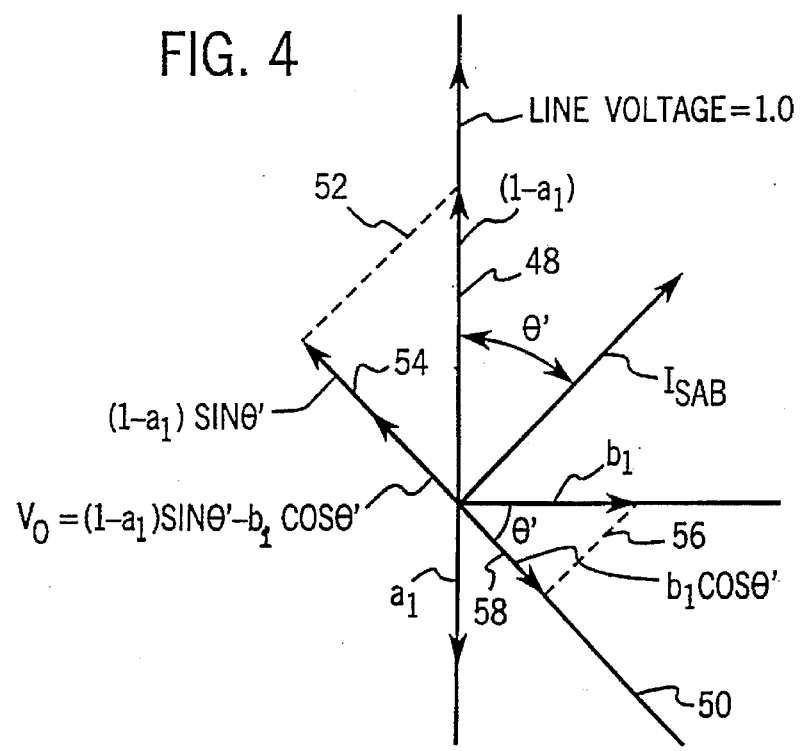
FIG. 4 is a phaser diagram representing line voltage, line current, thyristor voltage and various other motor parameters.

Referring now to FIG. 4, a phaser diagram depicts the relationship between a source voltage which has been normalized to a value of 1 to simplify this explanation, line current $I_{SAB}$, and the $a_1$ and $b_1$ components of the thyristor voltage $V_{Thy}$. In FIG. 4 (as in FIGS. 3(b) and 3(c)), the line current $I_1$ lags the source voltage $V_{SAB}$ by the phase angle $\theta'$. Referring still to FIG. 4 and Equations 25 and 29, the $a_1$ component of the thyristor voltage $V_{Thy}$ is in phase with the source voltage $V_{SAB}$. The $a_1$ component directly effects the magnitude of source voltage $V_{SAB}$ and is therefore subtracted from $V_{SAB}$ yielding phaser 48 (i.e., 1-$a_1$).

Drawing a line 52 perpendicular to line 50 through the distal end of phasor 48, a total reactive voltage phaser 54 can be calculated as $(1-a_1)\sin\theta'$ which represents the voltage due to reactance associated with the series connection including the thyristor and winding associated with line 14 as well as the thyristor and winding associated with line 16.

In addition to the $a_1$ component, the thyristor voltage $V_{Thyf}$ also includes voltage component $b_1$ where $b_1$ leads the source voltage by 90°. Drawing line 56 perpendicular to line 50 through the distal end of the $b_1$ component, a thyristor reactive voltage phasor 58 can be calculated as $b_1 \cos\theta$ extending in the opposite direction as the first reactive phasor. The thyristor reactive voltage phasor 58 represents the voltage due to the combined reactance of both thyristors in lines 14 and 16. By subtracting the second voltage phasor 58 from the first 54, and adjusting the result to account for the earlier normalization of the source voltage, referring to FIG. 4 and current $I_{SAB}$, the fundamental RMS voltage $V_{frms}$ for motor reactance can be expressed as:

$$V_{frms} = \sqrt{3}\, V_S [(1 - a)\sin\theta' - b_1 \cos\theta'] \quad (33)$$

Combining Equations 31–33 and simplifying:

$$V_{frms} = \frac{\sqrt{3}\, V_s (\pi - \gamma) - \sin\gamma) \sin\theta}{\pi} \quad (34)$$

After the fundamental RMS voltage $V_{frms}$ due to motor reactance is determined, the current due to the reactance must also be determined so that motor reactance can be found.

Referring again to FIG. 3(b), the current $I_{SAB}$ for two phase calibration firing can be observed. Referring also to FIG. 3(c), the fundamental two phase current $I_{fAB}$ lags the terminal voltage $V_{TAB}$ by angle $\theta'$. Choosing the zero reference point to be the midpoint between consecutive zero crossings of the fundamental two phase current $I_{fAB}$, the two phase calibration current $I_{fAB}$ can be expressed as:

$$i(\omega t) = \cos(\omega t) - \sin\frac{\gamma}{2} \quad (35)$$

Squaring the current and integrating from $-\zeta/2$ to $\zeta/2$ where $$\zeta = \pi - \gamma$$

$$I_{lrms}^2 = \frac{1}{\pi} \int_{-\frac{\zeta}{2}}^{\frac{\zeta}{2}} i^2(\omega t) d\omega t \quad (36)$$

Combining Equations 35 and 36, integrating and simplifying:

$$I_{lrms} = \sqrt{\frac{1}{2\pi}((\pi-\gamma)(2-\cos\gamma)-3\sin\gamma)} \quad (37)$$

Next, the peak value of fundamental line current $I_{fp}$ can be expressed as:

$$I_{fp} = \frac{2}{\pi}\int_{-\frac{\zeta}{2}}^{\frac{\zeta}{2}} i(\omega t)\cos(\omega t)d(\omega t) \quad (38)$$

Combining Equations 35 and 38, integrating and simplifying:

$$I_{fp} = \frac{1}{\pi}(\pi-\gamma-\sin\gamma) \quad (39)$$

and therefore:

$$I_{frms} = \frac{1}{\pi\sqrt{2}}(\pi-\gamma-\sin\gamma) \quad (40)$$

Combining Equations 37 and 40:

$$I_{frms} = \frac{I_{lrms} * (\pi-\gamma-\sin\gamma)}{\sqrt{((\pi-\gamma)(2-\cos\gamma)-3\sin\gamma)\pi}} \quad (41)$$

Two phase motor reactance $2X_\sigma$ can be calculated as:

$$2X_\sigma = V_{frms}/I_{frms} \quad (42)$$

Combining Equations 34, 41, and 42 and simplifying:

$$X_\sigma = \frac{\sqrt{3} \ V_s * \sin\theta * \sqrt{((\pi-\gamma)*(2-\cos\gamma)-3\sin\gamma)\pi}}{2\sqrt{\pi} * I_{lrms}} \quad (43)$$

The motor reactance $X_\sigma$ is a constant for any given motor and will not change during start-up periods. The controller determines both the source voltage $V_s$ and the notch width $\gamma$ and therefore, both of these values are known during the calibration exercise. Because the controller with which this invention is intended to be used cannot provide RMS line current $I_{lrms}$ values, during calibration, additional RMS line current sensing hardware is required which can feed RMS line current $I_{lrms}$ values to the controller. Once the motor reactance $X_\sigma$ is determined, the additional current sensing hardware is no longer required.

After motor reactance $X_\sigma$ is determined, $X_\sigma$ can be used during a start-up period to calculate RMS line current $I_{lrms}$ in real time. U.S. Pat. No. 5,153,489, which issued on Oct. 16, 1992, and is entitled "Electric Current Measurement Apparatus For A Solid State Motor Controller," identifies an equation which can be used to relate the thyristor voltage $V_{Thy}$, the motor reactance $X_\sigma$, and the duration of the notch $\gamma$ to derive a line RMS current value. The equation is:

$$I_{lrms} = F(\gamma) \cdot \frac{V_{Thy}}{X_\sigma} \cdot F_1(\gamma) \quad (44)$$

where:

$$F(\gamma) = \sqrt{\frac{\pi}{3}} \cdot \frac{\sqrt{18(\pi-\gamma)+\cos\gamma(9\gamma-12\pi)-27\sin\gamma}}{2\pi-3\gamma-3\sin\gamma} \quad (45)$$

$$F_1(\gamma) = \frac{\gamma}{3(1+f(\gamma))-\sin\frac{\gamma}{2}} \quad (46)$$

and $f(\gamma)$ is:

$$f(\gamma) = \frac{\left(\frac{3}{2\pi}\right)(\gamma+\sin\gamma)}{1-\left[\left(\frac{3}{2\pi}\right)(\gamma+\sin\gamma)\right]} \quad (47)$$

Because the thyristor voltage $V_{Thy}$ is monitored, the line RMS current $I_{lrms}$ can be calculated using Equation 44:

Thus, the present invention contemplates both a method and an apparatus for determining RMS line current during start-up periods in AC induction motors using parameters which are already typically monitored by a regulating motor controller. In one embodiment, where locked rotor information is provided by a motor manufacturer, the locked rotor current information is used, in conjunction with source and thyristor voltages as well as the duration of the non-conducting period to determine RMS fundamental current which is in turn used to calculate RMS line current. In the second embodiment, where locked rotor current information is not available, a motor reactance is calculated from a monitored source voltage, a monitored RMS line current, and a duration of the non-conducting period during a calibration procedure prior to three phase excitation of the motor. After the motor reactance is determined, during subsequent three phase excitation, the reactance is used along with sensed thyristor voltage and the duration of the non-conducting period to determine RMS line current.

In the first embodiment above no hardware in addition to standard motor controller hardware is required to determine RMS line current. In the second embodiment, an additional RMS line current sensor is required only during the preliminary calibration protocol prior to three phase operation of the motor. Thereafter, standard motor controller hardware is sufficient to determine RMS line current.

Figure 5:
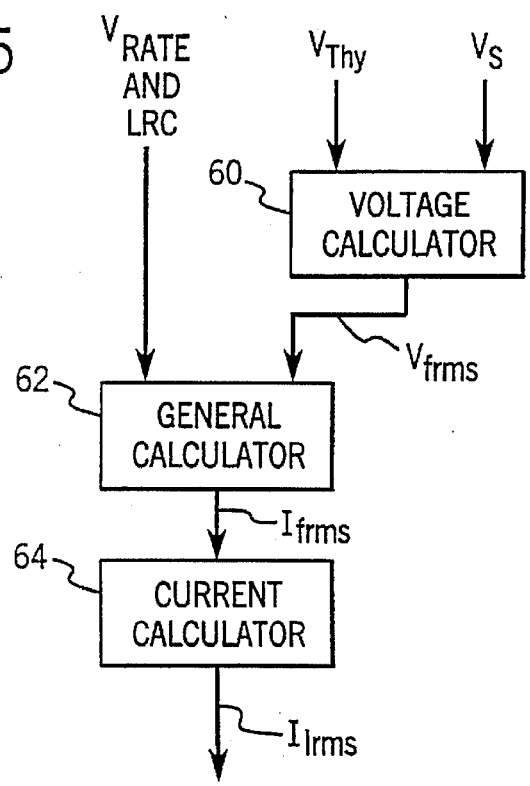
FIG. 5 is a schematic of various components of an apparatus in accordance with the present invention.

Referring now to FIG. 5, while the invention described above has been described in reference to various methods of finding RMS line current and only alludes to an apparatus for finding RMS line current, the present invention contemplates an apparatus. Where the locked rotor and rated voltage information is provided by a motor manufacturer, the apparatus of the present invention comprises a voltage calculator 60 for determining RMS fundamental voltage across a monitored stator according to Eq. 11 above using both a sensed thyristor and sensed source voltage value. The voltage calculator 60 provides the RMS fundamental voltage to a general calculator 62 which also receives the rated voltage $V_{RATE}$ and the LRC. The general calculator 62 mathematically combines the RMS fundamental voltage, the LRC value, and the rated voltage $V_{RATE}$ according to Eq. 22 providing the RMS fundamental current $I_{FRMS}$ to a current calculator 64. The current calculator 64 determines the RMS line current $I_{LRMS}$ from the RMS fundamental current $I_{FRMS}$ according to Eqs. 12, 19 and 22 above.

Figure 6:
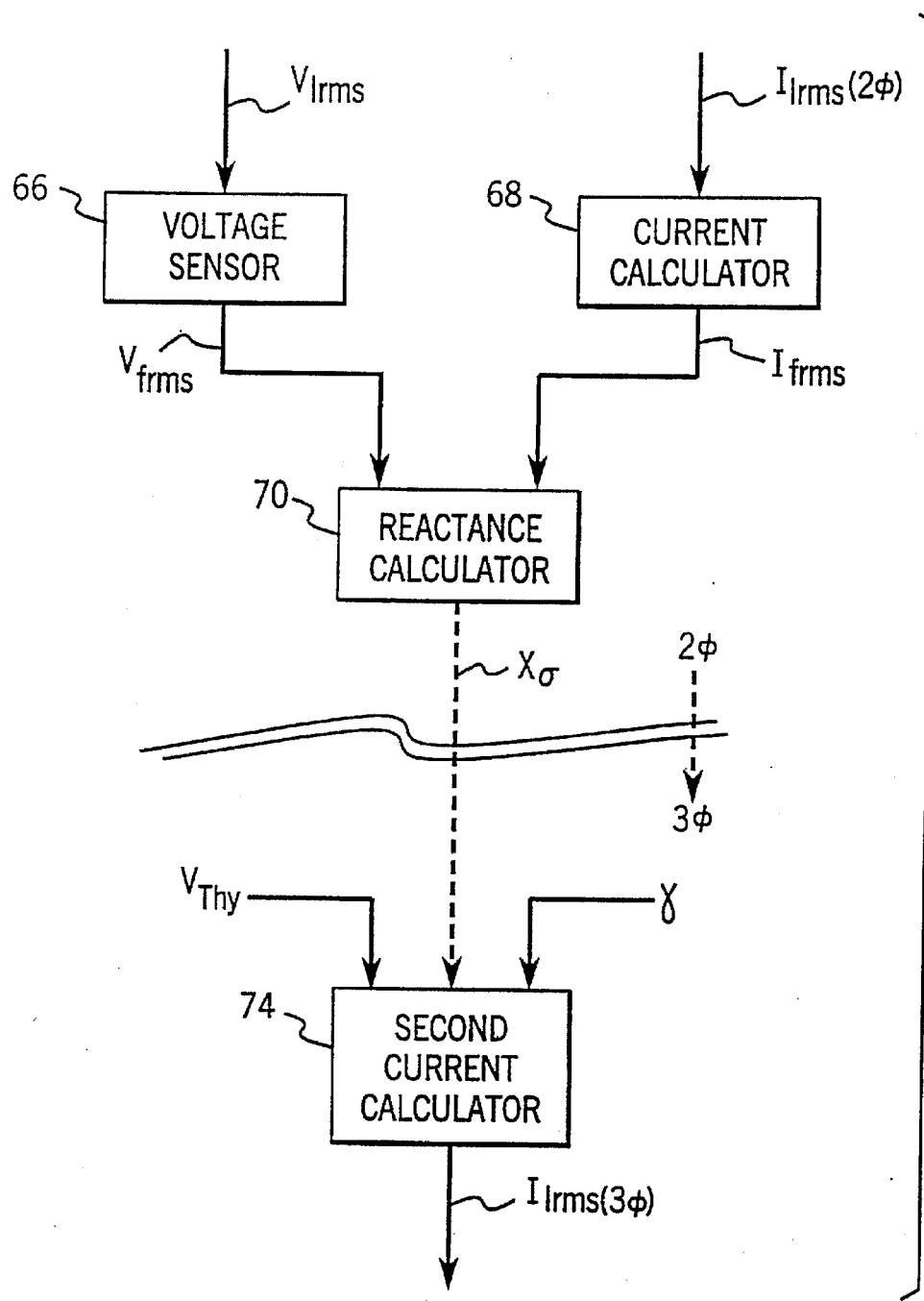
FIG. 6 is a schematic of various components of a second preferred embodiment of the apparatus according to the present invention.

Referring now to FIG. 6 where the locked rotor and rated voltage information is not provided by a motor manufacturer, the apparatus of the present invention is used to determine the motor reactance prior to three phase motor excitation. In this case, with the motor driver exciting only two of the three phases of the stator windings as explained above, a voltage sensor 66 monitors the RMS line voltage $V_{LRMS}$ and provides a RMS fundamental voltage $V_{FRMS}$ according to Eq. 34 above. In addition, a current calculator 68 monitors an RMS line current $I_{LRMS}$ and provides an RMS fundamental current $I_{FRMS}$ according to Eq. 41. The RMS fundamental voltage and current values $V_{FRMS}$, $I_{FRMS}$ respectively, are provided to a reactance calculator 70 which determines the motor reactance $X_\sigma$ according to Eq. 42.

Referring still to FIG. 6, as indicated by the dashed arrow below reactance calculator 70, the motor reactance $X_\pi$ is transferred to a second current calculator 74. During three phase excitation of the motor, the second current calculator 74 receives notch information γ from the line voltage module 23 (see FIG. 1) and a thyristor voltage value $V_{Thy}$ and provides an RMS line current $I_{lrms}$ according to Eq. 44 above.

It should be understood that the above described embodiments are simply illustrative of the principles of this invention. Various modifications and changes may be made by those skilled in the art which will embody the principals of the invention and fall within the spirit and scope thereof. In order to appraise the public of the many embodiments that may fall within the scope of the invention, the following claims are made:

We claim:

1. A method to be used with a motor controller, the controller controlling a three phase induction motor having three stator windings and providing an alternating current in each stator winding, the controller altering an RMS line current in each stator winding by producing a non-conducting period in each half cycle of the alternating current, the method used to determine the RMS line current through at least one stator winding during a starting period at the beginning of which the motor rotor is at rest, the motor characterized by a locked rotor current value and a rated voltage, the method comprising the steps of:

determining an RMS fundamental voltage across a monitored stator;

combining the RMS fundamental voltage, the locked rotor current value, and the rated voltage to provide an RMS fundamental current; and determining the RMS line current in said monitored stator winding from the RMS fundamental current and a duration of said non-conducting period in the alternating current.

2. The method recited in claim 1 wherein the controller includes three thyristor switches, each switch connected to a different stator winding, the alternating voltage supplied to each winding through an associated switch, a thyristor voltage appearing across each switch during an associated non-conducting period, the current on each phase lagging the voltage on said phase by a phase angle, the step of determining the RMS fundamental voltage including the steps of:

detecting the thyristor voltage;

detecting the duration of the non-conducting period in said stator winding;

detecting the phase voltage; and merging the thyristor voltage, the phase voltage and the duration of the non-conducting period.

3. The method of claim 2 wherein the step of merging derives the RMS fundamental voltage according to the expression:

$$V_{frms} = \frac{\sqrt{3}}{\sqrt{2}} \left( V_s - \frac{4}{\pi} V_{Thy} * \sin\left(\frac{\gamma}{2}\right) \right)$$

where γ is the non-conducting period, $V_{frms}$ is the RMS fundamental voltage, $V_s$ is the phase voltage and $V_{Thy}$ is the thyristor voltage.

4. The method of claim 1 wherein the step of combining derives the RMS fundamental current according to the following expression:

$$I_{frms} = \frac{LRC * V_{frms}}{V_{RATE}}$$

where LRC is the locked rotor current, $V_{RATE}$ is the rated voltage, $V_{frms}$ is the RMS fundamental voltage, and $I_{frms}$ is the RMS fundamental current.

5. The method of claim 1 wherein the controller provides the non-conducting period in terms of radians of a cycle of the alternating current, and said step of determining the RMS line current derives the RMS line current according to the expression:

$$I_{lrms} = I_{frms} / \frac{\sqrt{2}}{2\sqrt{\pi}} * \frac{2\pi - 3\gamma - 3\sin\gamma}{\sqrt{6(\pi-\gamma)+(3\gamma-4\pi)\cos\gamma - 9\sin\gamma}}$$

where γ is the non-conducting period, $I_{frms}$ is the RMS fundamental current, and $I_{lrms}$ is the RMS line current.

6. A method to be used with a motor controller, the controller controlling a three phase induction motor having three stator windings and providing an alternating current in each stator winding, the controller altering RMS line current in each stator winding by producing a non-conducting period in each half cycle of the alternating current, the method for determining the motor reactance prior to three phase motor excitation, the method comprising the steps of:

exciting only two of the three stator windings with said alternating current;

determining an RMS fundamental voltage across one of two said excited stator windings;

monitoring an RMS line current through one of said two excited stator windings;

determining an RMS fundamental current from the RMS line current;

determining a motor reactance from the RMS fundamental voltage and the RMS fundamental current.

7. The method of claim 6 wherein the controller includes three thyristor switches, each switch connected to a different stator winding, the alternating voltage supplied to each winding through an associated switch, a thyristor voltage appearing across each switch during an associated non-conducting period, the current on each phase lagging the voltage on said phase by a phase angle, the method further used to determine RMS line current during starting periods of three phase motor excitation, during a three phase starting period, the method further including the steps of:

determining the duration of each non-conducting period;

detecting thyristor voltage during each non-conducting period; and combining the motor reactance, the duration of each non-conducting period and associated thyristor voltages to provide the RMS line current.

8. The method of claim 7 wherein the controller provides the non-conducting period in terms of degrees of a cycle of the alternating current, and said step of combining provides the RMS line current according to the expression:

$$I_{lrms} = F(\gamma) \cdot \frac{V_{Thy}}{X_\sigma} \cdot F_1(\gamma)$$

where $X_{Thy}$ is the thyristor reactance, $X_\sigma$ is the motor reactance, γ is the duration of the non-conducting period, and $$F(\gamma) = \sqrt{\frac{\pi}{3}} \cdot \frac{\sqrt{18(\pi-\gamma) + \cos\gamma(9\gamma - 12\pi) - 27\sin\gamma}}{2\pi - 3\gamma - 3\sin\gamma}$$

$$F_1(\gamma) = \frac{\gamma}{3(1+f(\gamma)) - \sin\frac{\gamma}{2}}$$

and $$f(\gamma) = \frac{\left(-\frac{3}{2\pi}\right)(\gamma + \sin\gamma)}{1 - \left[\left(\frac{3}{2\pi}\right)(\gamma + \sin\gamma)\right]}.$$

9. The method of claim 6 wherein the line current lags the line voltage by a phase angle and the step of determining the RMS fundamental voltage includes the steps of:
   sensing the phase voltage; and
   combining the phase voltage, non-conducting period, and phase angle to provide the RMS fundamental voltage.

10. The method of claim 9 wherein the controller provides the non-conducting period and the phase angle in terms of radians of a cycle of the alternating current and the step of combining to provide the RMS fundamental voltage derives the RMS fundamental voltage according to the expression:

$$V_{frms} = \frac{V_s[(\pi-\gamma) - \sin\gamma]\sin\theta}{\pi}$$

where $\gamma$ is the non-conducting current, $\theta$ is the phase angle, $V_s$ is the phase voltage, and $V_{frms}$ is the RMS fundamental voltage.

11. The method of claim 6 wherein the controller provides the non-conducting period in terms of degrees of a cycle of the alternating current and the step of determining the RMS fundamental current from the RMS line current derives the RMS fundamental current according to the expression:

$$I_{frms} = \frac{I_{lrms}[(\pi-\gamma) - \sin\gamma]}{\sqrt{[(\pi-\gamma)(2-\cos\gamma) - 3\sin\gamma]\,\pi}}$$

where $\gamma$ is the non-conducting period, $I_{lrms}$ is the RMS line current and $I_{frms}$ is the RMS fundamental current.

12. The method of claim 6 wherein the step of determining a motor reactance from the RMS fundamental voltage and the RMS fundamental current derives the motor reactance according to the expression:

$$X_\sigma = V_{frms}/I_{frms}$$

where $X_\sigma$ is the motor reactance, $V_{frms}$ is the RMS fundamental voltage, and $I_{frms}$ is the RMS fundamental current.

13. An apparatus to be used with a motor controller, the controller controlling a three phase induction motor having three stator windings and providing an alternating current in each stator winding, the controller altering an RMS line current in each stator winding by producing a non-conducting period in each half cycle of the alternating current, the apparatus used to determine the RMS line current through at least one stator winding during a starting period at the beginning of which the motor rotor is at rest, the motor characterized by a locked rotor current value and a rated voltage, the apparatus comprising:
   a voltage calculator for determining an RMS fundamental voltage across a monitored stator;
   a general calculator for combining the RMS fundamental voltage, the locked rotor current value, and the rated voltage to provide an RMS fundamental current; and
   a current calculator for determining the RMS line current in said monitored stator winding from the RMS fundamental current and a duration of said non-conducting period in said stator winding.

14. The apparatus recited in claim 13 wherein the controller includes three thyristor switches, each switch connected to a different stator winding, the alternating voltage supplied to each winding through an associated switch, a thyristor voltage appearing across each switch during an associated non-conducting period, the current on each phase lagging the voltage on said phase by a phase angle, said voltage calculator including:
   a thyristor detector for detecting the thyristor voltage;
   a notch detector for detecting the duration of the non-conducting period in said stator winding;
   a phase detector for detecting the phase voltage; and
   a merger for merging the thyristor voltage, the phase voltage, and the duration of the non-conducting period.

15. The apparatus of claim 14 wherein the merger derives the RMS fundamental voltage according to the expression:

$$V_{frms} = \frac{\sqrt{3}}{\sqrt{2}}\left(V_s - \frac{4}{\pi} V_{Thy} * \sin\left(\frac{\gamma}{2}\right)\right)$$

where $\gamma$ is the non-conducting period, $V_{frms}$ is the RMS fundamental voltage, $V_s$ is the phase voltage and $V_{Thy}$ is the thyristor voltage.

16. The apparatus of claim 13 wherein the general calculator derives the RMS fundamental current according to the following expression:

$$I_{frms} = \frac{LRC * V_{frms}}{V_{RATE}}$$

where LRC is the locked rotor current, $V_{RATE}$ is the rated voltage, $V_{frms}$ is the RMS fundamental voltage, and $I_{frms}$ is the RMS fundamental current.

17. The apparatus of claim 13 wherein the controller provides the non-conducting period in terms of radians of a cycle of the alternating current, and the current calculator derives the RMS line current according to the expression:

$$I_{lrms} = I_{frms}/\frac{\sqrt{2}}{2\sqrt{\pi}} * \frac{2\pi - 3\gamma - 3\sin\gamma}{\sqrt{6(\pi-\gamma) + (3\gamma - 4\pi)\cos\gamma - 9\sin\gamma}}$$

where $\gamma$ is the non-conducting period, $I_{frms}$ is the RMS fundamental current, and $I_{lrms}$ is the RMS line current.

18. An apparatus to be used with a motor controller, the controller controlling a three phase induction motor having three stator windings and providing an alternating current in each stator winding, the controller altering RMS line current in each stator winding by producing a non-conducting period in each half cycle of the alternating current, the apparatus for determining the motor reactance prior to three phase motor excitation, the apparatus comprising:
   a driver for exciting only two of the three stator windings with said alternating current;
   a voltage sensor for determining an RMS fundamental voltage across one of two said excited stator windings;
   a current sensor for monitoring an RMS line current through one of said two excited stator windings;
   a current calculator for determining an RMS fundamental current from the RMS line current;
   a reactance calculator for determining a motor reactance from the RMS fundamental voltage and the RMS fundamental current.

19. The apparatus of claim 18 wherein the controller includes three thyristor switches, each switch connected to a different stator winding, the alternating voltage supplied to each winding through an associated switch, a thyristor voltage appearing across each switch during an associated non-conducting period, the current on each phase lagging the voltage on said phase by a phase angle, the apparatus further used to determine RMS line current during starting periods of three phase motor excitation, during a three phase starting period, the apparatus further including:

- a period detector for detecting the duration of each non-conducting period;
- a thyristor detector for detecting thyristor voltage during each non-conducting period; and
- a second current calculator for combining the motor reactance, thyristor voltage, and the non-conducting periods to provide the RMS line current.

20. The apparatus of claim 19 wherein the controller provides the non-conducting period in terms of radians of a cycle of the alternating current, and said second current calculator derives the RMS line current according to the expression:

$$I_{lrms} = F(\gamma) \cdot \frac{V_{Thy}}{X_\sigma} \cdot F_1(\gamma)$$

where $X_{Thy}$ is the thyristor reactance, $X_\sigma$ is the motor reactance, $\gamma$ is the non-conducting period, and $$F(\gamma) = \sqrt{\frac{\pi}{3} \cdot \frac{\sqrt{18(\pi-\gamma) + \cos\gamma(9\gamma - 12\pi) - 27\sin\gamma}}{2\pi - 3\gamma - 3\sin\gamma}}$$

$$F_1(\gamma) = \frac{\gamma}{3(1 + f(\gamma)) - \sin\frac{\gamma}{2}}$$

and:

$$f(\gamma) = \frac{\left(\frac{3}{2\pi}\right)(\gamma + \sin\gamma)}{1 - \left[\left(\frac{3}{2\pi}\right)(\gamma + \sin\gamma)\right]}.$$

21. The apparatus of claim 18 wherein the line current lags the line voltage by a phase angle and the RMS voltage sensor includes:

a phase voltage monitor for sensing the phase voltage; and a voltage calculator for combining the phase voltage, non-conducting period, and phase angle to provide the RMS fundamental voltage.

22. The apparatus of claim 21 wherein the controller provides the non-conducting period and the phase angle in terms of degrees of a cycle of the alternating current and the voltage calculator derives the RMS fundamental voltage according to the expression:

$$V_{frms} = \frac{V_s[(\pi - \gamma) - \sin\gamma]\sin\theta}{\pi}$$

where $\gamma$ is the non-conducting current, $\theta$ is the phase angle, $V_s$ is the phase voltage, and $V_{frms}$ is the RMS fundamental voltage.

23. The apparatus of claim 18 wherein the controller provides the non-conducting period in terms of radians of a cycle of the alternating current and the current calculator derives the RMS fundamental current according to the expression:

$$I_{frms} = \frac{I_{lrms}[(\pi - \gamma) - \sin\gamma]}{\sqrt{[(\pi - \gamma)(2 - \cos\gamma) - 3\sin\gamma] \pi}}$$

where $\gamma$ is the non-conducting period, $I_{lrms}$ is the RMS line current and $I_{frms}$ is the RMS fundamental current.

24. The apparatus of claim 18 wherein the reactance calculator derives the motor reactance according to the expression:

$$X_\sigma = V_{frms}/I_{frms}$$

where $X_\sigma$ is the motor reactance, $V_{frms}$ is the RMS fundamental voltage, and $I_{frms}$ is the RMS fundamental current.

* * * * *